Patented May 29, 1928.

1,671,721

UNITED STATES PATENT OFFICE.

HARRY K. IHRIG, OF MARTINEZ, CALIFORNIA, ASSIGNOR OF ONE-HALF TO SUMNER E. CAMPBELL, OF ASSOCIATED, CALIFORNIA, AND ONE-HALF TO ASSOCIATED OIL COMPANY, OF SAN FRANCISCO, CALIFORNIA, A CORPORATION OF CALIFORNIA.

METHOD OF OBTAINING NITROGENOUS-BASE OILS FROM HYDROCARBON MATERIALS.

No Drawing.   Application filed November 8, 1926.   Serial No. 147,182.

My invention relates to a novel method of obtaining nitrogenous base oils from hydrocarbon materials, such, for example, as shale or petroleum. These substances, particularly petroleum, produced in California, contain varying amounts of nitrogen compounds. These may be removed by treating them with relatively dilute solutions of sulfuric or other acids. But since the attempt to secure them from the crude stock itself presents many difficulties, it is more desirable to take distillates as the raw material. This proceeding is now well known especially in the case of petroleum distillates, and has been practised, as, for example, by the use of a solution containing approximately 25% sulfuric acid.

For like reasons, my invention contemplates preferably, though not necessarily, the selection of a distillate, instead of the crude stock, as the source from which to obtain the nitrogenous compounds; but it further contemplates, no matter what may be the raw material, crude or distillate, a specific treatment as the initial step of my method herein. I refer to the known treatment by liquid sulfur dioxide at relatively low temperature. Whereas by the ordinary method of refining by concentrated sulfuric acid or even by fuming sulfuric acid, a satisfactory result can only be produced by the use of large quantities of acid, resulting in a lower yield of finished product, and a high yield of sludge which is practically waste material, by the later known method above referred to, of treatment with liquid sulfur dioxide, instead of securing a sludge or waste material, the impurities removed are in liquid form, or in other words, an oil of dark color in which the impurities are concentrated. This oil is now known in the art as "extract" and for convenience, I shall herein use this term, with the understanding that it designates the dark colored liquid or oil removed from hydrocarbon materials by the liquid sulfur dioxide treatment.

Among other impurities, liquid sulfur dioxide removes nitrogenous compounds, so that in this "extract" there are concentrated substantially all the nitrogen compounds and other impurities originally present in the raw material.

The reason for the selection and use of this "extract" as comprising the initial steps of my process, is now obvious, in that the nitrogenous compounds which I seek to obtain are concentrated in it.

My complete method may now be stated as follows:—

I first treat the hydrocarbon material with liquid sulfur dioxide at low temperature and secure from said treatment a so-called "extract" consisting of an oil containing the impurities, including the nitrogenous compounds, which were in the raw material.

I then intimately mix with said "extract," dilute sulfuric acid to remove the nitrogen compounds. This treatment may be carried on in any suitable apparatus, either by a mechanical stirrer or by air agitation. In using the latter I take dilute sulfuric acid, for example of about 25% strength amounting to 10% of the total volume of extract to be treated, and, in order to concentrate or to build up in the acid liquor, as high a content of nitrogenous material as possible, I may use the same acid for the treatment of several batches of raw extract.

When the acid liquor has taken up as much nitrogenous material as desirable, it is withdrawn and neutralized. For this purpose, I have employed solid caustic soda in order to minimize the volume of material to be handled, although caustic soda or other alkaline sustances may be used in solution, or otherwise. The nitrogenous bases present in the extract combine with sulfuric acid and are present in the acid liquor as sulfates of the bases. On the addition of excess alkali, these sulfates are decomposed with the liberation of the free nitrogenous bases.

In order to obtain these free nitrogenous bases from the mixture, I distil the alkaline liquor in any suitable manner. A good form of distillation is by the introduction of steam into the liquid in the still. From this distillation I secure a distillate of condensed steam containing a small amount of such nitrogenous bases as are soluble in water, and free nitrogenous oils, which, being lighter than water, float on the steam condensate.

After the separation of the oils from the water, they are dried by suitable means and are then ready for any contemplated use.

While I choose to employ dilute sulfuric acid as a convenient material for removing nitrogenous bases, any acidic substance may be employed; for example, other acids or combinations of acid and clays which also have the property of combining with nitrogenous base may be used.

The nitrogenous bases herein referred to and sought to be obtained by my method may be defined as a mixture of basic compounds of carbon, hydrogen and nitrogen, of which the larger proportion is probably composed of nitrogen bases with the nitrogen in the ring; as for example, pyridine, quinoline and piperidine, and homologues thereof. Relatively small amounts of pyrrol and amino derivatives are also present in some cases in the crude material. Generally speaking the product is an oily liquid soluble in acid and insoluble in alkali. It precipitates with silico-tungstic acid from acid solution. Analysis of the recovered nitrogenous bases by the standard silico-tungstic method for nicotine shows from 30% to 50% calculated as nicotine.

The product is used, amongst other things, for an insecticide.

I claim:—

1. The method of obtaining nitrogenous-base oils from hydrocarbon materials, which comprises treating them with liquid sulfur dioxide to separate out an oil extract in which are concentrated the impurities, including the nitrogenous compounds, originally present in the raw material; treating said extract with a reagent adapted to combine with said nitrogenous compounds; and separating said compounds from the mixture.

2. The method of obtaining nitrogenous-base oils from hydrocarbon materials, which comprises treating them with liquid sulfur dioxide to separate out an oil extract in which are concentrated the impurities, including the nitrogenous compounds, originally present in the raw material; treating said extract with an acid reagent adapted to combine with said nitrogenous compounds; neutralizing said mixture; and separating said nitrogenous compounds from said neutralized mixture.

3. The method of obtaining nitrogenous-base oils from hydrocarbon materials, which comprises treating them with liquid sulfur dioxide to separate out an oil extract in which are concentrated the impurities, including the nitrogenous compounds, originally present in the raw material; treating said extract with an acid reagent adapted to combine with said nitrogenous compounds; neutralizing said mixture; and subjecting said neutralized mixture to distillation to separate the nitrogenous compounds.

4. The method of obtaining nitrogenous-base oils from hydrocarbon materials, which comprises treating them with liquid sulfur dioxide to separate out an oil extract in which are concentrated the impurities, including the nitrogenous compounds, originally present in the raw material; treating said extract with dilute sulfuric acid to combine with the nitrogenous compounds; neutralizing said mixture with an alkaline reagent; and separating said nitrogenous compounds from the neutralized mixture by subjecting it to distillation with steam.

In testimony whereof I have signed my name to this specification.

HARRY K. IHRIG.